Feb. 14, 1961
R. V. WERNER ET AL
2,972,047
TRANSMITTER RECEIVER
Filed Nov. 21, 1955
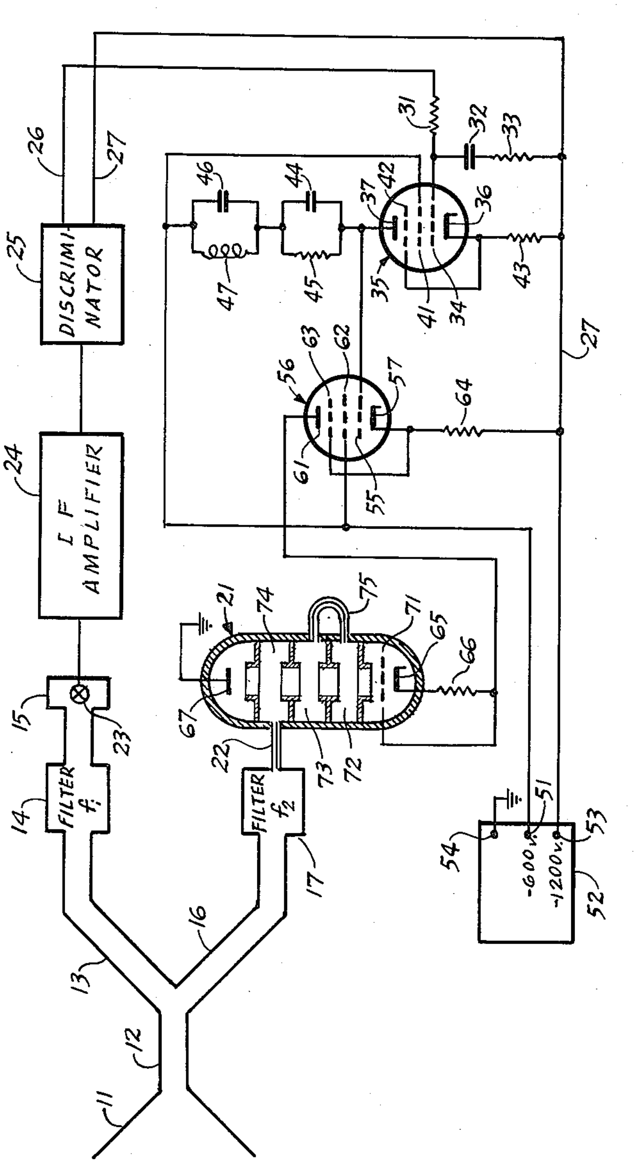
INVENTOR.
Robert V. Werner
James W. Crooks
Robert C. Weaver
BY
Walter J. Jason
ATTORNEY 2,972,047
Patented Feb. 14, 1961

2,972,047

TRANSMITTER-RECEIVER

Robert V. Werner, San Diego, Robert C. Weaver, La Jolla, and James W. Crooks, Jr., San Diego, Calif., assignors to General Dynamics Corporation, San Diego, Calif., a corporation of Delaware Filed Nov. 21, 1955, Ser. No. 548,182
4 Claims. (Cl. 250—15)

This invention relates to that class of receiver-transmitter combinations known as transponders, and more particularly, to a transponder wherein an electronic servo feedback system controls the characteristics of a modulated radio-frequency signal transmitted in response to a received modulated radio-frequency signal.

The form of transponders heretofore known to the art usually have included a receiver and an independent transmitter. In such devices, the signal output from a conventional receiver having a local oscillator with an associated frequency control device, an intermediate frequency amplifier and a detector, is employed to modulate a conventional transmitter having the usual amplifiers, modulator, oscillator, and frequency control equipment. Such transponders require precise frequency control associated with both the receiver local oscillator and the transmitter. Frequently, transponders must operate within precise frequency limitations. Thus, bulky and complex frequency control apparatus must be provided at both the receiver and transmitter. Furthermore, it is frequently necessary in such transponders for the transmitted modulation to maintain a constant phase and frequency relationship to the received modulation. Faithful retransmission of a received signal, both in phase and frequency, requires precise control of local oscillator frequency in order to maintain the difference between the received carrier frequency and the local oscillator frequency precisely at the center frequency of the intermediate frequency amplifier. As is well-known to those skilled in the art, distortion of the phase and frequency relationships of the modulating signal result if the intermediate frequency is not maintained precisely at the frequency to which the IF amplifier is tuned. In order to maintain such a precise relationship between the received signal frequency and the frequency of the local oscillator, complex automatic frequency control systems must be provided.

Another form of transponder heretofore known to the art merely consists of a high gain radio-frequency amplifier with the input terminals connected to a receiving antenna, and the output terminals thereof connected to a transmitting antenna. Although such transponders are satisfactory at low frequencies, radio-frequency amplification becomes increasingly difficult at higher frequencies, particularly when a broad band of frequency modulated signals must be amplified. In particular, such transponders are impractical at microwave frequencies.

A transponder constructed in accordance with this invention may include a receiver, a radio-frequency oscillator, and a feedback circuit. Means are provided whereby the radio-frequency oscillator simultaneously serves as a local oscillator in conjunction with the receiver, and as a transmitting oscillator. By means of the feedback circuit, the frequency of the radio-frequency oscillator is maintained at a frequency differing from that of the received signal by an amount equal to the receiver intermediate frequency. Furthermore, the feedback circuit serves to modulate the oscillator with the received modulating signal. The feedback circuit additionally serves to maintain the phase and frequency characteristics of the transmitted modulating signal as a faithful reproduction of the received signal.

It is therefore, an object of this invention to provide a transponder capable of receiving and retransmitting a modulated signal.

Another object of this invention is to provide a transponder wherein the transmitted radio-frequency signal bears a fixed frequency relationship to the received radio-frequency signal.

Another object of this invention is to provide a transponder wherein the transmitting oscillator also serves as a local oscillator at the receiver.

Another object of this invention is to provide a transponder wherein the modulation of a transmitted signal is determined by the modulation of a received signal.

Another object of this invention is to provide means enabling the frequency and phase relationships of a transmitted modulating signal to be controlled by a received modulating signal through a feedback loop.

Another object of this invention is to provide a transponder with a feedback circuit capable of compensating for the nonlinear response to the modulating signal of various portions of the transponder.

Another object of this invention is to provide a transponder capable of faithfully transmitting a modulated microwave signal at a fixed frequency difference in relation to a received modulated microwave signal.

Another object of this invention is to provide a microwave transponder which faithfully retransmits a received modulation accurately imposed upon a precise carrier frequency, is simple and inexpensive to construct, and is suitably light in weight and rugged enough for airborne applications.

Other objects and advantages of this invention will become apparent from the following specification and claims taken in connection with the appended drawing.

The single figure of the drawing is a schematic circuit diagram of a microwave transponder embodying this invention. An antenna 11, serving to simultaneously receive and transmit microwave signals, is connected to a waveguide Y junction 12. A first arm 13 of Y junction 12 is connected to a microwave filter 14, tuned to pass the frequency of the received signal. Such microwave filters are well-known to the art, and may comprise a resonant cavity, a plurality of iris diaphragms or other suitable arrangements. The signal passed by filter 14 is applied to a crystal mixer 15, of a type well-known to the art. The Y junction 12 is furnished with a second arm 16 connected to a second microwave filter 17. Filter 17, which may be similar in structure to filter 14, is tuned to pass the transmitted radio-frequency signal. A suitable radio-frequency oscillator 21 generates the transmitted radio-frequency, and, additionally, provides the local oscillator signal to crystal mixer 15. Radio-frequency cable 22 connects the output of radio-frequency oscillator 21 to filter 17.

A small portion of the transmitted radio-frequency signal generated by oscillator 21 is allowed to leak through arm 13 of Y junction 12 and through filter 14 to crystal mixer 15, thereby furnishing a local oscillator signal to crystal mixer 15. A semi-conductor crystal diode 23, of a type well-known to those skilled in the art, is provided in mixer 15 to generate a beat frequency at the intermediate frequency of the receiver. Exemplarily, a received radio-frequency signal of 5060 megacycles may be applied to mixer 15, and beat with the transmitted radio-frequency signal of 5000 megacycles from microwave oscillator 21. A resultant intermediate frequency signal of 60 megacycles is, therefore, furnished to intermediate frequency amplifier 24 by crystal mixer 15. The intermediate frequency signal is amplified by intermediate frequency amplifier 24, and is applied to discriminator detector 25, wherein the modulating signal imposed upon the intermediate frequency signal is detected. Although a frequency modulation discriminator is disclosed herein in connection with a frequency modulated signal, it will be apparent that an amplitude modulation detector may be employed in place thereof for use in connection with an amplitude modulated signal.

As is well-known to those skilled in the art, the modulating signals detected by a discriminator may be a band of frequencies ranging from direct current through as high a frequency as may be desired. Exemplarily, in the herein disclosed embodiment of this invention, the modulating signals may include a band of frequencies ranging from 0 to 100 kilocycles per second.

The modulating signals detected by discriminator 25 are applied by means of conductors 26 and 27 to a D.C. amplifier incorporating a compensating impedance network. The discriminator output signal, present on conductors 26 and 27, is applied to a first group of compensating impedances including a resistor 31 in series with conductor 26, a capacitor 32 and resistor 33 in series with conductor 26, and a capacitor 32 and resistor 33 in serial relation to one another, connected between resistor 31 and conductor 27. Compensating resistor 31 and capacitor 32 are connected to control electrode 34 of electron discharge device 35. In addition to control electrode 34, electron discharge device 35 includes a cathode 36, and anode 37, screen electrode 41, and suppressor electrode 42. Cathode 36 is connected to conductor 27 through a resistor 43. In addition, cathode 36 is connected to suppressor electrode 42. Anode 37 is connected to a second compensating network including a capacitor 46 and an inductance 47 connected in parallel. Both of said parallel circuits are serially connected to one another, and to anode 37 of electron discharge device 35. Anode 37 is connected to terminal 51 of power supply 52 by means of conductor 53, inductance 47 and resistor 45. Cathode 36 of discharge device 35 is connected to terminal 53 of power supply 52 through conductor 27 and resistor 43. A negative potential of 1200 volts, provided at terminal 53, is applied to cathode 36. Terminal 51 of power supply 52 provides a negative potential of 600 volts to anode 37 of discharge device 35 by means of conductor 53. The third terminal 54 of power supply 52 is grounded. It will be apparent, therefore, that anode 37 is supplied with a potential which is 600 volts more positive than the potential of cathode 34. In addition, screen electrode 41 is connected to conductor 53, thereby maintaining screen electrode 41 at the same potential as anode 37.

The compensated output signal from the anode 37 of electron discharge device 35 is applied to control electrode 55 of electron discharge device 56. Electron discharge device 56 includes a cathode 57 and an anode 61 in addition to control electrode 55. Electron discharge device 56 may additionally include a screen electrode 62 and a suppressor electrode 63. Cathode 57 is connected to terminal 53 of power supply 52 by means of conductor 27 and cathode resistor 64. Screen electrode 62 is connected to terminal 51 of power supply 52 by means of conductor 53. Suppressor electrode 63 is connected to cathode 57. Anode 61 is connected to cathode 65 of oscillator 21 through cathode resistor 66.

As is well-known to those skilled in the art, a radio-frequency signal may be generated by velocity modulated electron discharge device, such as discharge device 21. The frequency of the generated signal may be modulated by varying the voltage applied between cathode 65 and collector electrode 67. Therefore, modulator electron discharge device 56 is serially connected between terminal 53 of power supply 52, and oscillator 21. It will be apparent, therefore, that modulator discharge device 56 may vary the voltage across oscillator 21 in response to a signal applied to control electrode 55 in a manner more fully disclosed hereinbelow.

Oscillator 21 includes a collector electrode 67, connected to ground, a control grid 71 connected to anode 61 of discharge device 56, a first cavity 72, a second cavity 73, and a third cavity 74. Cavities 72, 73 and 74 are tuned to the desired frequency, exemplarily, 5000 megacycles. An oscillator is formed by cavities 72 and 73, connected by a feedback radio-frequency line 75. Cavity 74 is employed as a tuned buffer amplifier. As is well-known to those skilled in the art, such a three cavity velocity modulated electron discharge device functions as an oscillator with an associated buffer amplifier. The output signal from cavity 74 is coupled to filter 17 by means of radio-frequency cable 22.

In the herein disclosed embodiment of this invention, it is assumed that a frequency modulated radio-frequency carrier is received by antenna means 11. The radio-frequency carrier, exemplarily at a frequency of 5060 megacycles per second, passes through arm 13 of Y junction 12, through tuned filter 14, and is applied to crystal mixer 15. Inasmuch as filter 17 is tuned to pass the frequency of oscillator 21, exemplarily 5000 megacycles per second, a high impedance is presented by arm 16 of Y junction 12, thereby directing the received signal into arm 13. The 5000 megacycle per second signal generated by oscillator 21 is passed through tuned filter 17, arm 16 of Y junction 12, and is radiated by antenna means 11. Filter 17 also serves to attenuate any noise which may be generated by oscillator 21. However, filter 14 is tuned broadly enough to allow a small portion of the 5000 megacycle signal to pass through filter 14 and applied to crystal mixer 15. The received 5060 megacycle signal is beat against the 5000 megacycle signal from oscillator 21 by means of crystal diode 23 in a manner well-known to those skilled in the art, and the difference frequency of 60 megacycles generated thereby is applied to intermediate frequency amplifier 24. Intermediate frequency amplifier 24 may be of any suitable type having a band width broad enough to pass the range of modulating signals.

The modulated signal amplified by intermediate frequency amplifier 24 is applied to discriminator 25. As is well-known to those skilled in the art, the output voltage of a discriminator circuit is proportional to frequency deviation. Therefore, the modulating signal is removed from the frequency modulated intermediate frequency carrier by the discriminator and is furnished to a compensating circuit by means of conductors 26 and 27. The modulating signal applied to conductors 26 and 27 by discriminator 25 may range in frequency from direct current to several hundred kilocycles per second. The phase and amplitude relationships of the broad band of frequencies comprising the modulating signal may be distorted by the phase and gain characteristics of the various elements of the transponder. A compensating circuit comprising discharge device 35 and its associated impedance network is supplied to correct such distortions in a manner well-known to those skilled in the art. Such compensating networks may be of the type disclosed on pages 244–249 of "Radio Engineers' Handbook," First Edition, by F. E. Terman, published by McGraw-Hill Book Company. The compensated modulating signal is then applied to a frequency modulator including modulator discharge device 56. Microwave oscillator 21 is frequency modulated by discharge device 56 in accordance with the detected and amplified received signal. As pointed out hereinabove, in addition to retransmitting the received modulating signal, a small portion of the frequency modulated output from oscillator 21 is beat with the received signal. The modulating signal is therefore, fed back into the intermediate frequency amplifier, and is detected by the discriminator. It will be apparent, therefore, that the modulating signal is operated upon by a closed loop feedback circuit composed of the mixer, intermediate amplifier, discriminator compensating amplifier, modulator and oscillator. The compensated feedback loop thus established enables the wave-shape of the transmitted modulating signal to be a substantially exact replica of the waveshape of the received modulation. However, as is well-known to those skilled in the art, the various components of the transponder included in such a feedback loop may each have individual transfer characteristics which may distort the modulating signal. Therefore, a compensating circuit is provided for the purpose of equalizing the gain and phase relationships throughout the feedback loop. The compensating circuit includes electron discharge device 35, and a compensating impedance network including resistors 31, 33 and 45, capacitors 32, 44 and 46, and inductance 47. Resistors 31 and 33, and capacitor 32 increase the gain of the compensating circuit, and, therefore, of the feedback loop at low modulating frequencies, while capacitors 44 and 46, resistor 45 and inductance 47 serve to increase gain at relatively high modulating frequencies. Therefore, the characteristics of the compensating circuit are such that the combined non-linear characteristics of the various components of the feedback loop are compensated for by the complementary non-linear characteristics of the compensating circuit. The resultant gain and phase characteristics of the complete modulating signal feedback loop are such that the transmitted modulating signal is a substantially exact, amplified, replica of the received modulating signal.

The compensated modulating signal is obtained from anode 37 of electron discharge device 35 and is applied to control electrode 55 of modulator electron discharge device 56. Cathode 57 of electron discharge device 56 is connected through cathode bias resistor 64 to terminal 53 of power supply 52. As disclosed hereinabove, terminal 53 supplies a high negative potential, exemplarily —1200 volts. Anode 61 of electron discharge device 56 is connected to cathode 65 of oscillator 21 through cathode bias resistor 66. Anode 67 of oscillator 21, and terminal 54 of power supply 52 are both connected to ground. It will be seen, therefore, that discharge device 56 and oscillator 21 are connected in series with the —1200 volts furnished by power supply 52. The compensated modulating signal applied to control electrode 55 of discharge device 56 varies the space current flowing through discharge device 56. Since oscillator 21 is serially connected between power supply 52 and discharge device 56, the voltage across oscillator 21 is varied in accordance with the modulating signal.

The frequency generated by a velocity modulated electron discharge device, such as oscillator 21, is determined partially by the physical dimensions of cavities 72, 73 and 74, and partially by the potential applied between cathode 65 and collector 67. The dimensions of cavities 72, 73 and 74 serve to define a band of frequencies over which oscillator 21 may operate. The particular frequency within the band thus defined at which oscillator 21 operates is determined by the potential present between cathode 65 and collector 67. As disclosed hereinabove, oscillator 21 is connected to —1200 volt terminal 53 of power supply 52 in series relation with modulator electron discharge device 56. The normal current through the series circuit thus established is adjusted by means of discharge device 56 to establish the desired voltage drop across oscillator 21, thereby establishing the potential required for operation at the desired frequency. The compensated output signal from the compensating circuit including electron discharge device 35 is applied to control electrode 55 of modulating electron discharge device 56. As is well-known to those skilled in the art, the signal voltage applied to control electrode 55 varies the voltage drop across discharge device 56. Since a constant potential of —1200 volts is present across the series circuit including modulator device 56 and oscillator 21, if the voltage drop through modulator electron discharge device 56 is increased, the voltage drop across oscillator 21 will decrease, and vice versa, thereby frequency modulating the output signal from oscillator 21. The frequency modulated output signal from oscillator 21 is then applied to antenna 11 through arm 16 of Y junction 12.

As disclosed hereinabove, the center frequency generated by oscillator 21 is maintained at a value 60 megacycles per second from the center frequency of the received signal. The signal generated by oscillator 21 is maintained at the required frequency by means of the modulating signal feedback loop disclosed hereinabove, which also serves as an automatic frequency control circuit. If the signal generated by oscillator 21 drifts from the required center frequency, a D.C. voltage of a polarity and magnitude proportional to the direction and amount of frequency drift is produced by discriminator 25. The D.C. voltage thus generated is passed through the compensating circuit and is applied to modulator electron discharge device 56. The modulator varies the voltage applied to oscillator 21 in the manner disclosed hereinabove, thereby returning the frequency of oscillator 21 to the correct value.

Although the embodiment of this invention disclosed hereinabove is adapted to transmit and receive signals in the same direction over the same antenna, it will be apparent that the transponder disclosed herein may be constructed in a manner enabling reception of a signal from one direction and transmission in another direction. In such modifications, independent receiving and transmitting antennas are employed. The receiving antenna may be connected directly to mixer 15, and a transmitting antenna may be connected to the buffer cavity 74 of oscillator 21 through radio-frequency cable 22. A small portion of the transmitted signal generated by oscillator 21 may be applied to mixer 15 in any suitable manner, exemplarily, by means of a coaxial line and a probe coupled to the mixer cavity.

It will be apparent, therefore, that hereinabove has been disclosed a novel transponder containing a closed loop feedback circuit for the modulating signal, and wherein a modulated signal received at one frequency is transmitted at another frequency determined by the received frequency. The received frequency modulated carrier is applied to a crystal mixer wherein it is beat with a small portion of the transmitted signal. The difference frequency is amplified by an intermediate frequency amplifier and detected by a discriminator. The detected modulating signal is passed through a compensating circuit containing an impedance network wherein the phase and gain characteristics of the feedback loop elements are compensated by the characteristics of the compensating circuit. The compensated modulating signal is employed to frequency modulate the transmitting oscillator. A small portion of the modulated output of the transmitting oscillator is fed back to the mixer, thereby completing the feedback loop.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. A transponder adapted to receive a signal at a first frequency and transmit a signal at a second frequency comprising a receiver including wave receiving means, a mixer, an intermediate frequency amplifier and a discriminator for generating modulating signals in accordance with the received signal, a compensating circuit associated with said receiver comprising a first electron discharge device having a control electrode and a cathode connected to said discriminator, an anode, a frequency responsive impedance network connected to said anode, said impedance network including a first parallel circuit including a capacitor and a resistor and a second parallel circuit including a capacitor and an inductance in serial relationship with said first parallel circuit whereby an equalized signal is produced at said anode, an oscillator comprising a velocity modulated electron discharge device for generating said second frequency signal, means for frequency modulating said oscillator in accordance with the equalized modulating signals comprising a second electron discharge device having a control electrode connected to the anode of said first electron discharge device and an anode in series with said oscillator, means for applying a portion of said second frequency signal to said mixer to produce an intermediate frequency, and wave transmitting means associated with said oscillator.

2. A transponder adapted to receive a signal at a first frequency and transmit a signal at a second frequency comprising an antenna, a first filter tuned to said first frequency, receiving means including, a mixer, an intermediate frequency amplifier and a discriminator for generating modulating signals in accordance with the received signal, a compensating circuit responsive to said discriminator including an electron discharge device and an electrical impedance network associated with said electron discharge device for correcting distortions of said modulating signals, an oscillator for said second frequency signal, a modulator comprising an electron discharge device responsive to said compensating circuit in series relationship with said oscillator for modulating said oscillator in accordance with the corrected modulating signals, a filter tuned to said second frequency, means for applying a first portion of said second frequency signal to said mixer to produce an intermediate frequency and a second portion to said antenna for transmission, said means including a second filter tuned to said second frequency, a transmission line Y junction having a first terminal connected to said first filter, a second terminal connected to said second filter, and a third terminal connected to said antenna.

3. A transponder adapted to receive a frequency modulated signal at a first frequency and transmit a frequency modulated signal at a second frequency comprising an antenna, a transmission line Y junction having a first terminal connected to said antenna, a first filter tuned to pass said first frequency connected to a second terminal of said Y junction, a receiver connected to said first filter including a mixer, an intermediate frequency amplifier tuned to the difference between said first frequency and said second frequency, and a discriminator for recovering modulating signals, a compensating circuit responsive to said discriminator including an electron discharge device and an electrical impedance network in circuit with said electron discharge device for correcting distortions of said modulating signals, a multi-cavity velocity modulated oscillator for generating said second frequency signal, a modulator comprising an electron discharge device having a control electrode connected to said compensating circuit and an anode connected in series with said oscillator for varying the voltage across said oscillator, thereby varying the frequency of said second frequency signal in accordance with said corrected modulating signals, and a second filter tuned to pass said second frequency connected between said oscillator and a third terminal of said transmission line Y network whereby a large portion of said second frequency signal is radiated by said antenna and a small portion of said second frequency signal passes said first filter, beats with said first frequency signal in said mixer and generating an intermediate frequency signal.

4. A transponder adapted to receive a frequency modulated signal at a first frequency and transmit a frequency modulated signal at a second frequency comprising an antenna, a transmission line Y junction having a first terminal connected to said antenna, a first filter tuned to pass said first frequency connected to a second terminal of said Y junction, a receiver connected to said first filter including a mixer, an intermediate frequency amplifier tuned to the difference between said first frequency and said second frequency, and a discriminator for recovering modulating signals, a compensating circuit responsive to said discriminator including an electron discharge device having a control electrode, an anode and a cathode, a first impedance network including a first resistor connecting said control electrode to said discriminator and a second resistor and a capacitor in series between said control electrode and said cathode, a second impedance network connected to said anode comprising a first parallel circuit including a first capacitor and a resistor and a second parallel circuit in series with said first parallel circuit including a second capacitor and an inductance, said compensating circuit thereby correcting distortions of said modulating signals, a multi-cavity velocity modulated oscillator for generating said second frequency signal, a modulator comprising an electron discharge device having a control electrode connected to said compensating circuit and an anode connected in series with said oscillator for varying the voltage across said oscillator, thereby varying the frequency of said second frequency signal in accordance with said corrected modulating signals, and a second filter tuned to pass said second frequency connected between said oscillator and a third terminal of said transmission line Y network whereby a large portion of said second frequency signal is radiated by said antenna and a small portion of said second frequency signal passes said first filter, beats with said first frequency signal in said mixer and generating an intermediate frequency signal.

References Cited in the file of this patent

UNITED STATES PATENTS

| | | |
|---|---|---|
| 1,735,344 | White | Nov. 12, 1929 |
| 2,028,866 | Hansell | Jan. 28, 1936 |
| 2,144,836 | Dietrich | Jan. 24, 1939 |
| 2,148,532 | Chaffee | Feb. 28, 1939 |
| 2,408,826 | Vogel | Oct. 8, 1946 |
| 2,412,935 | Tashjian | Dec. 17, 1946 |
| 2,507,139 | Boosman | May 9, 1950 |
| 2,544,255 | Chireix | Mar. 6, 1951 |
| 2,570,758 | Braden | Oct. 9, 1951 |
| 2,748,284 | Segerstrom | May 29, 1956 |
| 2,777,054 | Dahlberg | Jan. 8, 1957 |
| 2,820,138 | Haard | Jan. 14, 1958 |

OTHER REFERENCES

Terman: Radio Engineer's Handbook (1st Ed., 1943), pp. 224–249.